(No Model.)
T. S. HEATH.
SULKY.
No. 544,918. Patented Aug. 20, 1895.
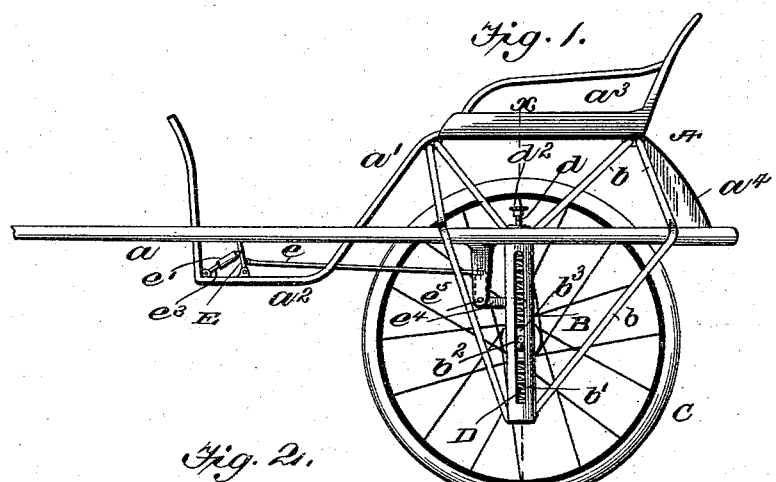
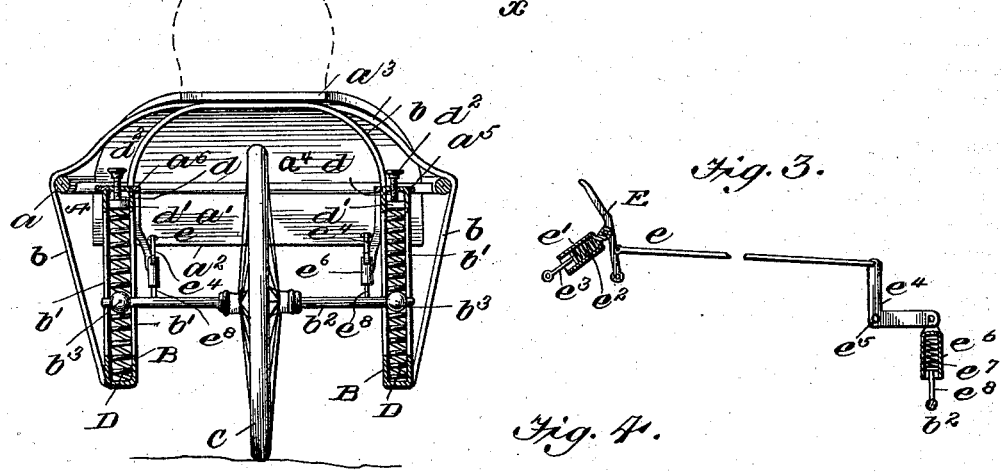
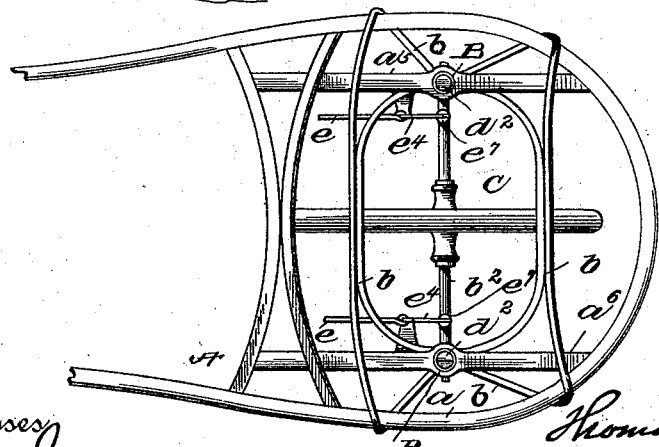
Witnesses
Inventor
Thomas S Heath
By John W Morris
Attorney

UNITED STATES PATENT OFFICE.

THOMAS S. HEATH, OF CROSS TIMBERS, MISSOURI.

SULKY.

SPECIFICATION forming part of Letters Patent No. 544,918, dated August 20, 1895.

Application filed May 18, 1895. Serial No. 549,830. (No model.)

*To all whom it may concern:*

Be it known that I, THOMAS S. HEATH, of Cross Timbers, in the county of Hickory and State of Missouri, have invented certain new and useful Improvements in Sulkies; and I do hereby declare the following to be a full, clear, and exact description of the invention, such as will enable others skilled in the art to which it appertains to make and use the same.

This invention relates to a new and improved sulky or unicycle, and has for its object the production of a simple and highly-improved vehicle of this class specially designed for racing purposes, in which the position of the wheel can be shifted or changed to conform to any inclination of the body of the vehicle and also to aid in the turning of bends or curves in the road. The body of the vehicle has two cylinders, in which fit the ends of the axle of the single wheel, the same being held by upper and lower springs, and this axle is capable of being moved up and down at its ends by means of foot-levers on the platform of the body, thus enabling the position of the wheel to be shifted at will.

The invention comprises the novel features of construction and also the detail combination and arrangement of parts, substantially as hereinafter fully set forth, and particularly pointed out in the claims.

In the accompanying drawings, Figure 1 is a side elevation. Fig. 2 is a transverse sectional view on the line $x\ x$, Fig. 1, portions of the vehicle-body being shown in dotted lines. Fig. 3 is a longitudinal sectional view on the line $y\ y$, Fig. 2. Fig. 4 is a plan view with parts broken away.

Referring to the drawings, A designates the vehicle-frame; $a$, the shafts; $a'$, the body of the vehicle, comprising the platform $a^2$, seat $a^3$, rear mud-guard $a^4$, and inner frame-bars $a^5$ and $a^6$.

B B designate two cylinders connected directly to bars $a^5\ a^6$ and the frame A and body $a'$ by a series of brace-straps $b$, which hold said cylinders in approximately vertical position. These cylinders are provided with inner and outer opposite longitudinal slots $b'$.

C is a wheel of any known form, and is preferably provided with a rubber tire. Its axle $b^2$ is extended through the slots $b'$ of cylinders B and provided with balls or spherical portions $b^3$, which fit in said cylinders between upper and lower coil-springs D, which serve to hold both ends of the axle at uniform points. The spring-tension may be regulated by a screw-rod $d$, working in the upper end of each cylinder and having a block $d'$ at its lower end bearing on the upper end of the upper spring. The outer ends of these screw-rods have circular heads $d^2$.

E E are two foot-pedals, connected by links or pitmen $e$ to axle $b^2$, for allowing the raising or lowering of either end thereof, according to the inclination at which it is desired to throw the wheel. Each foot-pedal is pivoted at its lower end to platform $a^3$ and is held approximately perpendicular by spring-pressure. A cylinder $e'$ is connected to each foot-pedal and the same incloses a spring $e^2$ and a plunger-rod $e^3$, which latter is pivoted at its outer end to the platform. Each link or pitman is connected at its forward end to one of the foot-pedals, and is extended through the body beneath the seat and connected to a bell-crank lever $e^4$, fulcrumed at $e^5$ to bars $a^5$ and having cylinders $e^6$, secured thereto and designed to inclose springs $e^7$ and plunger-rods $e^8$, attached at their lower ends to axles $d^2$. When the pedals are in their normal positions, the axle is on a horizontal plane, but in turning curves or the like, where the body of the vehicle is caused to assume a more or less incline, the operator will naturally remove the pressure from one of the foot-pedals, retaining the pressure on the other pedal, thus relieving the pressure on one end of the axle and applying it on the other end or that to which the released pedal is connected, thus allowing the wheel and axle to assume an inclination corresponding to that of the vehicle-body.

From what has been said it will be seen that I have provided a sulky or unicyle which is simple in construction, and by means of which the position of the axle can be readily changed. When the pressure on both pedals is uniform, the axle is maintained in an approximately horizontal position; but when pressure is maintained upon one pedal and released from the other the axle will assume an inclination to correspond to the vehicle-body, the rider usually throwing his weight in such manner as to naturally withdraw the pressure from one pedal and apply it to the other.

I claim as my invention—

1. A unicycle having a yieldingly-supported axle, and means for shifting the position of said axle to conform to any desired inclination, as set forth.

2. A unicycle having a yieldingly-supported axle, and means connected to said axle at or near its ends for applying variable pressure thereto, as set forth.

3. A unicycle having its axle yieldingly supported, foot-pedals and links or pitmen connected to said pedals and designed to bear on said axle at or near its ends, as set forth.

4. A unicycle having its axle yieldingly-supported, spring-pressed pedals, and links or pitmen connected with said axle at or near its ends, as set forth.

5. A unicycle having its frame provided with slotted cylinders, a wheel having its axle fitted in said cylinders, springs in said cylinders, and means connected to said axles near its ends for increasing and releasing the pressure thereon, as set forth.

6. A unicycle having its frame provided with slotted cylinders, a wheel having its axle fitted in said cylinders, springs in said cylinders, pivoted foot-pedals, links or pitmen connected thereto, and spring-pressed connections between said links or pitmen and axles, substantially as set forth.

7. The combination with the vehicle frame and body, of the slotted cylinders secured to said frame and body, the wheel having its axle fitted in said cylinders, springs acting thereon, foot-pedals pivoted to said body, springs acting thereon, links or pitmen connected to said foot-pedals, levers to which said links or pitmen are connected, and springs between said levers and said axle, substantially as set forth.

8. The combination with the vehicle frame and body, of the slotted cylinders secured to said frame and body, the wheel having its axle fitted in said cylinders, springs acting thereon, foot-pedals pivoted to said body, cylinders connected to said pedals, springs inclosed therein, plunger rods pivoted at their outer ends to said body and working in said cylinders, links or pitmen connected to said foot-pedals, bell-crank levers, cylinders connected thereto, springs inclosed therein, and plunger-rods working in said cylinder and connected at their outer ends to said axle, substantially as set forth.

9. The combination with the frame and body, of the slotted cylinders, upper and lower springs located therein, adjustable rods in the upper ends of said cylinders for regulating the tension of said springs, the wheel having its axle provided with spherical portions fitted between said springs, the spring-pressed foot pedals, the spring-pressed levers for acting on said axle near its ends, and links or pitmen connecting said foot-pedals to said levers, substantially as set forth.

In testimony whereof I have signed this specification in the presence of two subscribing witnesses.

THOMAS S. HEATH.

Witnesses:
E. H. NOLAND,
R. H. NEASE.